3,201,420
OXYALKYLATION OF ETHYLIDENE GLYCEROL AND COMPOSITIONS PRODUCED THEREBY

Stephen Fuzesi, Hamden, and Joseph V. Karabinos, Orange, Conn., assignors to Olin Mathieson Chemical Corporation, a corporation of Virginia
No Drawing. Original application July 27, 1962, Ser. No. 213,055. Divided and this application Oct. 22, 1962, Ser. No. 238,313
7 Claims. (Cl. 260—340.7)

The present invention relates to novel oxyalkylated compositions and processes for obtaining them. More particularly, the present invention relates to novel compositions having excellent characteristics and capable of a wide variety of uses and to the processes whereby these novel compositions are obtained. This application is a divisional of parent application Serial No. 213,055, filed July 27 1962.

It is highly desirable to obtain oxyalkylated derivatives of glycerol which have a large percentage of primary hydroxyl groups. Direct oxyalkylation of glycerol gives polymers having low primary hydroxyl concentrations, generally lower than 5 percent. A higher primary hydroxyl concentration is desirable since primary hydroxyls are more reactive than secondary hydroxyls.

Thus, it is desirable to prepare novel oxyalkylated derivatives of glycerol which are more reactive than those known heretofore.

It has been found that such novel compositions can be simply and expeditiously prepared in accordance with the present invention. These novel compositions are readily prepared by simple oxyalkylation of known ethylidene glycerols in the presence of a basic catalyst. The resultant product is an oxyalkylenemonohydroxypolyoxyethylidene glycercol. These compounds may then be converted to the trihydroxy derivatives by simple hydrolysis.

Both the monohydroxy and trihydroxy compounds are characterized by a wide variety of utility. The monohydroxy compounds may be used, for example, as lubricants or surfactants. In addition, the monohydroxy compounds are useful in the preparation of the trihydroxy compounds. The trihydroxy compounds find utility, for example, in the preparation of polyurethane foams and polyurethane coatings.

Ethylidene glycerol is known and is prepared by reacting glycerol with acetylene in a manner after Hill et al., JACS 2, 2246 (1928). Conventionally, the glycerol is reacted with acetylene in the presence of a small amount of mercuric sulfate and concentrated sulfuric acid as catalyst. Normally, around 3 percent of mercuric sulfate and 5 percent concentrated sulfuric acid by weight of glycerol is utilized. The resultant product is an isomeric mixture of 1,3-ethylidene glycerol (Compound A below), and 1,2-ethylidene glycerol (Compound B below).

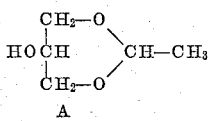

A and

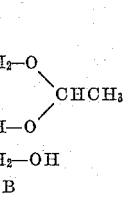

B

Compound A is the low boiling isomer and Compound B is the high boiling isomer and the usual proportion is in the ratio of 1 part 1,3-ethylidene glycerol to 1.8 parts 1,2-ethylidene glycerol.

These two isomers can be readily separated or the isomeric mixture may be reacted in the manner of the present invention. It is usually more convenient to simply take the isomeric mixture and react it in accordance with the present invention.

The ethylidene glycerol is then oxyalkylated by reaction with an alkylene oxide in the presence of a basic catalyst. The reaction goes readily in the absence of solvent; however, inert solvents may be used if desired.

Any alkylene oxide may be readily employed. The characteristics of the resultant oxyalkylated ethylidene glycerol depend, of course, upon the alkylene oxide used and the degree of oxyalkylation. Generally, the ratio of alkylene oxide to ethylidene glycerol will vary from 200:1 to 1:1.

Throughout the present specification the term alkylene oxide is intended to include any alkylene oxide or alkylene oxide containing non-interferring substituents, such as hydroxyalkylene oxides for example glycidol and haloalkylene oxides, for example epihalohydrins. The lower alkylene oxides are preferred. Additional exemplificative compounds include ethylene oxide, propylene oxide, butylene oxide, isobutylene oxide, tetramethylene oxide, n-hexyl oxide, etc. Cycloalkylene oxides may also be used, for example, cyclobutylene oxide, cyclohexylene oxide, etc.

The reaction goes readily by merely admixing the alkylene oxide and the ethylidene glycerol. In the preferred process a small amount of anti-oxidant is employed, such as 3,5-ditertiarybutyl-p-hydroxy toluene, 2-tertiary-butyl-p-methoxyphenol, and 2,6-ditertiarybutyl-p-cresol. Generally from 0.5 to 4 percent of anti-oxidant by weight of the ethylidene glycerol is employed. Generally, the alkylene oxide is slowly introduced into a reaction vessel containing the catalyst, anti-oxidant and ethylidene glycerol. Prior to introduction of the alkylene oxide the reaction vessel is preferably flushed with a stream of dry, inert gas, such as nitrogen, in order to remove any air or oxygen therefrom. The elimination of molecular oxygen from the reaction vessel avoids oxidative decomposition of the product and the obtaining of a colorless product.

Under certain conditions during the oxyalkylation there is obtained a small amount of ethylidene glycerol ring opening.

The reaction is generally conducted below 200° C. and preferably in the range of 75 to 150° C. The reaction is generally exothermic and it is necessary to remove excess heat in order to maintain the reaction temperature in the desired temperature range. The reaction time is not critical and will vary depending on the temperature, reactants and amounts thereof, catalyst and amount thereof and degree of completion desired.

The conventional basic catalysts are employed generally in amounts from 0.5 to 10 percent by weight based on the ethylidene glycerol. The conventional organic or inorganic basic activators which may be employed preferably are an alkali metal or an alkaline earth metal hydroxide or alkoxide, such as sodium hydroxide, potassium hydroxide, calcium hydroxide, sodium methoxide, pyridine or the like. The resultant product is a novel oxyalkylated monohydroxypolyoxyethylidene glycerol having the formula $C_5H_9O_2$—O—(R—O)$_m$H wherein $m$ is an integer from 1 to 200 and wherein R is a divalent alkylene radical. When the ethylidene glycerol employed is a mixture of isomers, the oxyalkylated product is also a mixture of isomers. When the pure 1,3- or 1,2-ethylidene glycerol is used a mixture of isomers would not be obtained.

The oxyalkylated ethylidene glycerol products of the present invention are believed to have the following structural formulas:

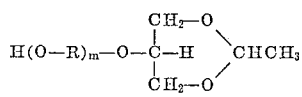

and

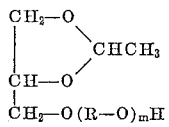

wherein $m$ and $R$ are as defined above. Representative alkylene oxides are as listed above. Typical substituents will vary depending on the particular alkylene oxide employed. Alternatively, mixtures of alkylene oxides may be conveniently employed, thus yielding mixed products.

These novel monohydroxypolyoxyalkylene ethers may be readily converted by hydrolysis to the trihydroxypolyoxyalkylene ethers with one hydroxyl group on the end of the polyether chain and two hydroxyl groups in the glycerol nucleus. The trihydroxy compounds have the formula $C_3H_7O_2\text{—}O\text{—}(R\text{—}O)_mH$ wherein $m$ and $R$ are as defined above. The hydrolyzed oxyalkylated ethylidene glycerols are believed to have the following structural formulas wherein $R$ and $m$ are as above:

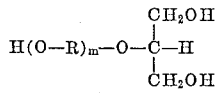

and

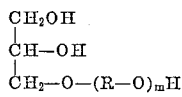

The oxyalkylated ethylidene glycerol may be hydrolyzed in any conventional manner, preferably under mild conditions. Generally the oxyalkylated ethylidene glycerol is treated with a dilute acidic solution for at least 30 minutes. The maximum treatment time is not critical. Preferably a dilute acidic solution is employed which has a concentration of acid of from 5 to 20 percent by weight. Weak acids are preferred, such as phosphoric. Others which may be used include, for example, sulfuric, nitric, hydrochloric, etc.

The process of the present invention will be more readily apparent from a consideration of the following illustrative examples.

*Example 1*

Sixteen grams of mercuric sulfate were triturated in a mortar with sixteen cc. of concentrated sulfuric acid and the resulting paste added with stirring to 184 grams of glycerol in the reaction flask. After sweeping out the air with acetylene, 90 liters of the same gas were led in, under slight hydrostatic pressure from a gasometer. The reaction flask was surrounded by water bath maintained at 70° C. After the required amount of acetylene had been added (about 8 hours) the reaction product was dissolved in diethylether, filtered, and neutralized with solid potassium carbonate. The ether was removed and the product fractionated under reduced pressure. 460 grams of isomeric mixture of 1,2- and 1,3-ethylidene glycerol were obtained.

B.P. 84 to 104° C. at 20 mm. pressure
OH number—Calculated: 475 mg. KOH/gm. Found: 473 mg. KOH/gm.
Concentration of ethylidene parts calculated as acetaldehyde—Calculated: 37 percent. Found: 35.45 percent.

*Example 2*

Into a 5-liter three-necked reaction vessel purged with dry nitrogen were charged 118 grams of ethylidene glycerol (from the reaction product given in Example 1), 4,5 grams potassium hydroxide pellets and 3 grams of 2,6-ditertiarybutyl-p-cresol as anti-oxidant. The vessel was pressured with dry nitrogen and tested for leaks. Heat was then applied to the reactor and the temperature gradually brought to 125° C. Then 1,2-propylene oxide was added to the well-agitated ethylidene glycerol-potassium hydroxide-anti-oxidant mixture at a rate such as to maintain the temperature between 120 to 140° C. The addition of propylene oxide was continued for a period of about 17 hours until approximately 26 parts of propylene oxide had been added per part by weight of ethylidene glycerol. After all the propylene oxide was added the sytsem was allowed to cool to 110° C. and then placed under a water pump. At least one hour's time was allowed for the removal of any unreacted propylene oxide. Then the reaction product was neutralized using phosphoric acid. Three percent of Attapulgus clay was added for absorption of any dissolved salt. The mixture was then stripped at 100° to 105° C./2 mm. for three hours and filtered. The product was a viscous, light colored liquid polypropoxylated ethylidene glycerol.

Primary hydroxyl percent by analysis: 5
Secondary hydroxyl percent by analysis: 95

The product had a molecular weight of 3500 and had the approximate formula $C_5H_9O_2\text{—}O\text{—}(C_3H_6\text{—}O)_{60}H$.

*Example 3*

2500 grams of polypropoxylated ethylidene glycerol (from the reaction given in Example 2) was heated for one and a half hours with 60 cc. of 5 percent phosphoric acid-water solution under reflux condenser. The latter in turn was connected to a well cooled spiral condenser to collect the acetaldehyde. After the aldehyde separation the reaction mixture was neutralized using potassium hydroxide solution. Then three percent of Attapulgus clay was added and the mixture was stripped at 100° to 105° C./2 mm. for three hours and filtered. The resultant reaction product was a viscous, light colored liquid containing 23 percent primary and 67 percent secondary hydroxyl groups and had the approximate formula $C_3H_7O_2\text{—}O\text{—}(C_3H_6\text{—}O)_{60}H$.

*Example 4*

In a manner after Example 2 an oxyethylated ethylidene glycerol was prepared by reacting ethylene oxide and ethylidene glycerol. The resultant product was a viscous, light colored liquid having the approximate formula $C_5H_9O_2\text{—}O\text{—}(C_2H_4\text{—}O)_{60}H$.

*Example 5*

The oxyethylated ethylidene glycerol of Example 4 was hydrolyzed in a manner after Example 3 to give a viscous, light colored liquid having a high primary hydroxyl content and having the approximate formula $C_3H_7O_2\text{—}O\text{—}(C_2H_4\text{—}O)_{60}H$.

*Example 6*

In a manner after Example 2 an oxybutylated ethylidene glycerol was prepared by reacting 1,2-butylene oxide and ethylidene glycerol. The resultant product was a viscous, light colored liquid having the approximate formula $C_5H_9O_2\text{—}O\text{—}(C_4H_8\text{—}O)_{50}H$.

*Example 7*

The oxybutylated ethylidene glycerol of Example 6 was hydrolyzed in a manner after Example 3 to give a viscous, light colored liquid having a high primary hydroxyl content and having the approximate formula $C_3H_7O_2\text{—}O\text{—}(C_4H_8\text{—}O)_{50}H$.

The following examples show the preparation of a polyurethane foam from the product of the present invention.

Example 8

The following ingredients were admixed until a homogeneous mixture was obtained: 100 parts of the product of Example 3; 1 part of silicone oil; 0.5 part of N-ethyl morpholine; 0.5 part of stannous octoate; 0.1 part of triethylenediamine; and 3.5 parts of water. When the mixture became homogeneous there was added 44.5 parts of a mixture of isomers of tolylene diisocyanate (about 80% 2,4-tolylene diisocyanate and 20% 2,6-tolylene diisocyanate) and the resultant mixture stirred for 15 seconds. The mixture was then allowed to rise for 90 seconds whereupon a fully expanded, flexible polyurethane foam was obtained. The foam was characterized by good physical properties.

This invention may be embodied in other forms or carried out in other ways without departing from the spirit or essential characteristics thereof. The present embodiment is therefore to be considered as in all respects illustrative and not restrictive, the scope of the invention being indicated by the appended claims and all changes which come within the meaning and range of equivalency are intended to be embraced therein.

What is claimed is:

1. An oxyalkylated ethylidene glycerol having the formula selected from the group consisting of (A)

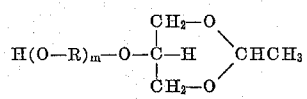

(B)

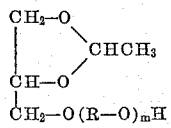

and (C) mixtures of (A) and (B), wherein $m$ is an integer from 1 to 200 and wherein R is alkylene.

2. A composition of the formula

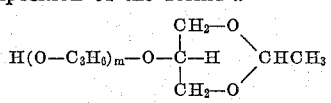

where $m$ is an integer from 1 to 200.

3. A composition of the formula

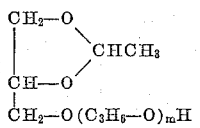

where $m$ is an integer from 1 to 200.

4. A composition of the formula

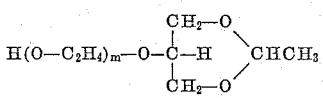

where $m$ is an integer from 1 to 200.

5. A composition of the formula

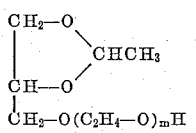

where $m$ is an integer from 1 to 200.

6. A composition of the formula

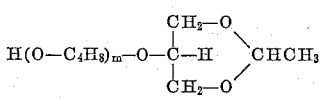

where $m$ is an integer from 1 to 200.

7. A composition of the formula

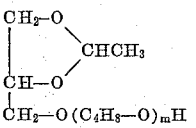

where $m$ is an integer from 1 to 200.

References Cited by the Examiner

UNITED STATES PATENTS

| | | | |
|---|---|---|---|
| 2,723,294 | 11/55 | Benoit | 260—615 |
| 2,786,080 | 3/57 | Patton | 260—615 |
| 2,831,034 | 4/58 | Pruitt et al. | 260—615 |

WALTER A. MODANCE, *Primary Examiner.*

NICHOLAS RIZZO, *Examiner.*